US012779514B2

(12) United States Patent
Schell

(10) Patent No.: US 12,779,514 B2
(45) Date of Patent: Nov. 3, 2026

(54) AGRICULTURAL SPRAYER AND METHOD FOR TREATING AN AGRICULTURAL FIELD

(71) Applicant: AGCO International GmbH, Neuhausen (CH)

(72) Inventor: Daan Schell, Meerlo (NL)

(73) Assignee: AGCO International GmbH, Neuhausen (CH)

( * ) Notice: Subject to any disclaimer, the term of this patent is extended or adjusted under 35 U.S.C. 154(b) by 64 days.

(21) Appl. No.: 19/047,388

(22) Filed: Feb. 6, 2025

(65) Prior Publication Data

US 2026/0225123 A1 Aug. 6, 2026

Related U.S. Application Data

(60) Continuation of application No. 18/522,645, filed on Nov. 29, 2023, now abandoned, which is a division of
(Continued)

(30) Foreign Application Priority Data

Dec. 19, 2018 (GB) ..................................... 1820704

(51) Int. Cl.

| | |
|---|---|
| ***B05B 15/55*** | (2018.01) |
| ***A01C 23/04*** | (2006.01) |
| ***A01M 7/00*** | (2006.01) |

(52) U.S. Cl.
CPC ............ *B05B 15/55* (2018.02); *A01C 23/047* (2013.01); *A01M 7/0085* (2013.01)

(58) Field of Classification Search
CPC .. B08B 9/093; B08B 2203/007; A01M 7/005; A01M 7/0085
See application file for complete search history.

(56) References Cited

U.S. PATENT DOCUMENTS 5,125,576 A 6/1992 Ziegenbein
6,364,010 B1 4/2002 Richman et al.
(Continued)

FOREIGN PATENT DOCUMENTS

CN 207927656 U 10/2018
DE 8711752 U1 10/1987
(Continued)

OTHER PUBLICATIONS

UK Intellectual Property Office, Search Report for related UK Application No. GB1820704.3, dated Apr. 17, 2019, 3 pages.
(Continued)

*Primary Examiner* — Michael E Barr

(57) ABSTRACT

An agricultural sprayer a chassis carrying an engine, a boom, a product tank, a rinse tank, a heat transfer system, a manifold, and a spray applicator. The heat transfer system is configured to transfer waste heat to the rinse tank. A controller is configured to control a pump and a distribution valve to deliver liquid from the product tank and the rinse tank through nozzles to an agricultural field. A method for treating an agricultural field includes propelling an agricultural sprayer through a field; heating a rinse fluid to a temperature above an ambient temperature using waste heat from a heat source; rinsing nozzles by transferring the heated rinse fluid from a rinse tank through the nozzles; and after rinsing the nozzles, spraying liquid from a product tank to the agricultural field.

6 Claims, 6 Drawing Sheets

Related U.S. Application Data application No. 17/413,823, filed as application No. PCT/EP2019/082874 on Nov. 28, 2019, now abandoned.

(56) References Cited

U.S. PATENT DOCUMENTS

| | | | |
|---|---|---|---|
| 2012/0266981 | A1 | 10/2012 | Ringer et al. |
| 2012/0267449 | A1 | 10/2012 | Ringer et al. |
| 2013/0140374 | A1 | 6/2013 | Adams et al. |
| 2016/0165873 | A1 | 6/2016 | de Ong |

FOREIGN PATENT DOCUMENTS

| | | | |
|---|---|---|---|
| EP | 2617286 | B1 | 7/2018 |
| FR | 2474354 | B1 | 1/1984 |

OTHER PUBLICATIONS

European Patent Office, Search Report for related PCT Application No. PCT/EP2019/082874, dated Apr. 22, 2022, 10 pages.

AGRICULTURAL SPRAYER AND METHOD FOR TREATING AN AGRICULTURAL FIELD

TECHNICAL FIELD

The present invention relates to an agricultural sprayer and a method of operating such a sprayer.

BACKGROUND

Agricultural sprayers are used in the application of various materials to field crops. Such systems apply various chemicals in the form of a spray for the purposes of crop protection, e.g., with appropriate pesticides or herbicides, or for the purposes of limiting or promoting plant growth, e.g., through use of liquid growth regulators and fertilizer, respectively. Agricultural sprayers may be provided as self-propelled sprayers, or as systems to be mounted to an agricultural tractor, e.g., as a towed or hitch-mounted implement.

Agricultural crop sprayers typically comprise a product tank for holding a solution of plant protection product, and a product dispensing system for applying the solution to the field or crop. The product dispensing system is commonly provided by a series of nozzles spaced along a boom which itself extends transversely with respect to a forward direction of travel. A plumbing network is provided to fluidly connect the product tank with the nozzles and typically comprises hoses and controllable valves to direct the fluid as required.

One of the primary concerns in the use of potentially harmful chemicals such as pesticides or fertilizers is that proper cleaning and maintenance of sprayers is necessary to avoid injury to non-target crop species, e.g., through the incorrect application of residual chemicals from a preceding sprayer operation. Accordingly, sprayer operators must pay close attention to proper cleaning procedures, to prevent contamination or injury to crops or to the environment in general.

It is known to provide sprayers with an on-board rinse tank which is separate to the product tank and is connected to the plumbing network. During a rinse process, which may be concurrent with a spraying operation, clean water is conveyed from the rinse tank through the plumbing network to the nozzles and/or the product tank. The dilute 'rinsings' are then dispensed onto the crop, onto a piece of land, or into a biobed for example.

Such cleaning procedures often require the rinsing of the product tank and plumbing with a large volume of rinse water to ensure safe concentration levels. However, such excessive use of water can be relatively wasteful, as well as resulting in increased cost levels for sprayer operators. In addition, sprayers can often be required to return to a centralized depot for a cleaning operation, if the relatively large volumes of rinse water or cleaning solutions are too bulky to transport with the sprayer itself.

BRIEF SUMMARY

An agricultural crop sprayer includes a product tank for holding a solution of plant protection product, a product dispense system, a rinse tank for holding a rinse fluid, and a plumbing network which fluidly connects the product tank, the product dispense system and the rinse tank, wherein the sprayer includes a heat source configured to heat the rinse fluid.

A method of operating an agricultural crop sprayer comprising a product tank for holding a solution of plant protection product, a product dispense system, and a rinse tank for holding a rinse fluid is also disclosed. The method includes heating the rinse fluid above ambient temperature and conveying the heated rinse fluid from the rinse tank to at least one of the product tank and the product dispense system.

By using rinse water or fluid that is heated above an ambient temperature, the sprayer is more effectively rinsed. Warm or hot water has an increased kinetic activity and a higher saturation point compared to cooler ambient water. Therefore, heated water is more effective at removing chemical residues, especially sticky or powdery residues that are difficult to shift with cold water. Advantageously, the disclosed system and method may deliver more effective removal of chemical residues and offer the potential to reduce the volume of water required to deliver sufficient cleaning.

In some embodiments, a prime mover provides the heat source. The prime mover may be an internal combustion engine or an electric motor by way of example. It will be recognized that sprayers typically include an engine, whether that be an engine of a self-propelled sprayer or an engine of a tractor towing a trailed sprayer. The prime mover may serve to deliver a driving torque to ground engaging wheels for propulsion of the sprayer.

Prime movers typically expel significant quantities of waste energy in the form of heat. Advantageously, this waste heat can be exploited to heat the rinse fluid. A heat exchange system may be configured to transfer waste heat from the prime mover to the rinse fluid wherein a first heat exchanger is arranged to extract waste heat from the prime mover.

Waste heat from the prime mover can be transferred to the rinse fluid using one of several different arrangements. In one embodiment, the heat exchange system involves a closed fluid circuit which includes the heat exchanger associated with the prime mover and a second heat exchanger located inside the rinse tank. In this arrangement, a closed cooling circuit of the prime mover is extended to transfer the waste heat to the rinse fluid indirectly. The second heat exchanger may, for example, comprise a coil immersed in the rinse fluid inside the rinse tank.

In another embodiment, waste heat is transferred directly from the prime mover to the rinse fluid. In this embodiment, the heat exchange system comprises a fluid circuit which includes the first heat exchanger fluidly connected to the rinse tank, wherein the rinse fluid serves as a heat exchange medium which is passed through, or proximate to, the prime mover.

The heat exchange system may further comprise a thermostat to regulate the temperature of the rinse fluid.

In yet another embodiment, a hydraulic system provides the heat source. The hydraulic system may include a hydraulic pump and one or more hydraulic consumers for powering various systems on the sprayer. In one example, a trailed sprayer comprises a hydraulic pump that is driven mechanically from a power takeoff shaft of a tractor attached to the sprayer. Waste heat generated by the hydraulic system may be collected and transferred to the rinse fluid by a heat exchange system, which may include a closed fluid circuit.

In the case of scavenged waste heat serving as the heat source, whether that be from a prime mover or from a hydraulic system, a further advantage is a reduced dedicated cooling requirement and thus a cooling system of a reduced size. In other words, the extraction of the waste heat itself serves to cool the prime mover or hydraulic system.

In yet another embodiment, a dedicated heat source is provided. For example, the heat source may be a liquid fuel burner or an electrically powered immersion heater.

In another embodiment, a further rinse tank serves as a cold rinse tank for holding rinse fluid at a cooler ambient temperature. In this arrangement, there is provided a heated rinse tank and an ambient or cold rinse tank. It is recognized that heated rinsings may have a detrimental effect if applied to a crop. By providing a second rinse tank for cooler water, a sequenced rinsing process may be employed wherein a heated rinse step is followed by a cold rinse step. The rinsings may be combined before being dispensed.

A sprayer having both hot and cold rinse tanks offers several advantages. Firstly, the heated rinsings may be cooled before being dispensed to crops as explained above. Secondly, a smaller volume of heated rinse fluid may be required, thus potentially allowing for the rinse fluid to be heated to higher temperatures with the same energy input.

BRIEF DESCRIPTION OF THE DRAWINGS

Further advantages of the invention will be apparent from reading the following description of specific embodiments of the invention with reference to the appended drawings in which.

DETAILED DESCRIPTION

Figure 1:
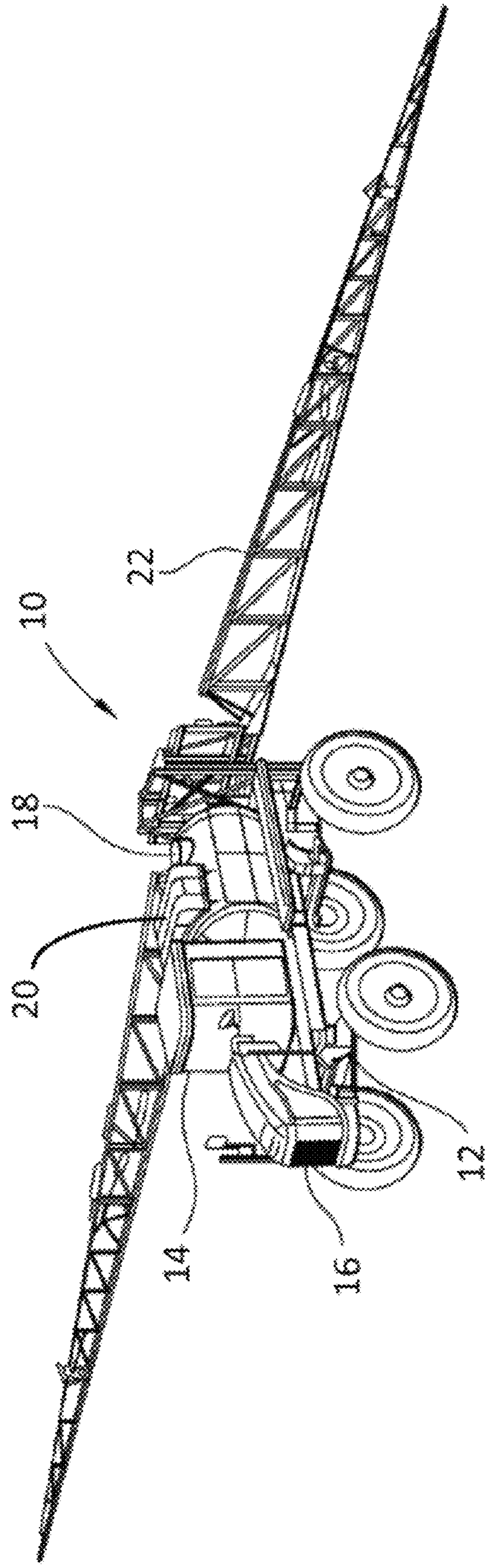
FIG. 1 is an illustration of an agricultural crop sprayer.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways.

Use of directional terms such as “front,” “rear,” “longitudinal,” and “transverse” in the following description of specific embodiments is made in relation to the normal forward direction of travel of an agricultural crop sprayer having a longitudinal axis parallel to the direction of travel.

Various embodiments are illustrated and described. Like components that are common to multiple embodiments will share the same reference numerals for ease of understanding.

FIG. 1 shows an agricultural crop sprayer 10 used to apply crop protection products to agricultural crops in a field. Agricultural crop sprayer 10 comprises a chassis 12 and a cab 14 mounted on the chassis 12. Cab 14 may house an operator and a number of controls for the sprayer 10. An internal combustion engine 16 may be mounted on a forward portion of chassis 12 in front of cab 14 or may be mounted on a rearward portion of the chassis 12 behind the cab 14. The engine 16 may comprise, for example, a diesel engine or a gasoline powered internal combustion engine. The engine 16 provides torque to propel the agricultural sprayer 10 and also to provide energy used to power the on-board spray systems described below.

Although a self-propelled crop sprayer is shown and described hereinafter, it should be understood that the disclosure is applicable to other agricultural sprayers including pull-type or towed sprayers and mounted sprayers, e.g., mounted on a 3-point linkage of an agricultural tractor.

The sprayer 10 further comprises a product tank 18 used to store a liquid solution of plant protection product to be sprayed on the field. The solution can include chemicals or plant protection products (PPPs), such as but not limited to, herbicides, fungicides, insecticides, plant growth regulators, and/or fertilizers. Product tank 18 is mounted on chassis 12, either in front of or behind cab 14. The crop sprayer 10 can include more than one product tank 18 to store different chemicals to be sprayed on the field. The stored chemicals may be dispersed by the sprayer 10 one at a time or different chemicals may be mixed and dispersed together in a variety of mixtures.

Figure 2:
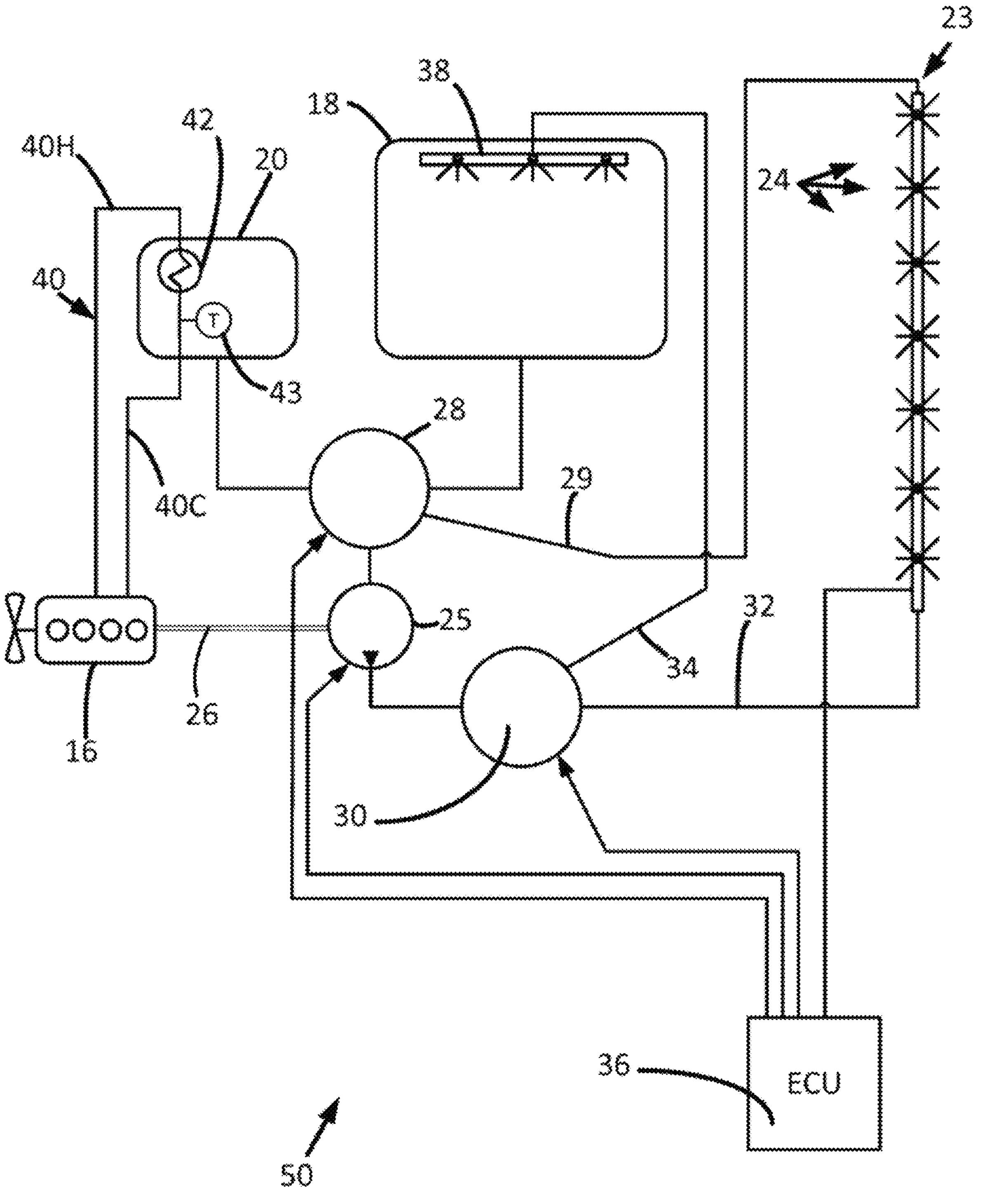
FIG. 2 is a schematic drawing of a sprayer system according to a first embodiment, for use with the sprayer of FIG. 1.

A sprayer system 50 according to one embodiment is illustrated in a schematic outline in FIG. 2. The sprayer system 50 is suitable for implementation on sprayer 10. System 50 further comprises a rinse tank 20 for holding a rinse fluid which can be used to rinse the product tank 18 and associated plumbing after or during a spraying operation.

At least one boom 22 on the sprayer 10 is used to distribute the fluid from the product tank 18 over a wide swath as the sprayer 10 is driven through the field. The boom 22 is mounted to the rear of the chassis 12 and extends transversely away the chassis 12. The boom is provided as part of a product dispense system 23, which further comprises an array of spray nozzles 24 arranged along the length of the boom 22.

A plumbing network fluidly connects the product tank 18, the product dispense system 23, and the rinse tank 20. The plumbing network will be understood to comprise any suitable valves, tubing, or piping arranged for fluid communication of these components.

In more detail, the plumbing network comprises a suction portion connected to a suction side of fluid pump 25 and a pressurized portion connected to a pressure side of pump 25. Pump 25 is driven in this embodiment by a drive connection 26 that derives torque from engine 16.

The suction portion of the plumbing network includes an input valve or manifold 28 that selectively connects a respective outlet of the product tank 18 and the rinse tank 20 to a suction side of the pump 25. A boom recirculation line 29 is also connected to the input manifold 28. The pressurized portion of the plumbing network comprises a distribution valve 30 that selectively directs pressurized fluid from the pressure side of pump 25 to one of a boom supply line 32 and a tank rinse line 34. The manifolds 28, 30 can comprise any suitable configuration of valve elements, e.g., a single multi-port valve element, or an array of individual elements.

The sprayer 10 further comprises an electronic control unit (ECU) 36, which is configured to control the operation of the various components of the system, e.g., the distribution valve 30, the input valve 28, the pump 25, the nozzles 24, and the boom arm 22 position. The ECU 36 can operate in response to commands issued by an operator in the sprayer cab 14, or based on pre-programmed operating routines, which may be triggered by operator action.

During a spraying mode of operation, the pump 25 draws PPP solution from the product tank 18 via input the manifold 28 and delivers the solution at pressure to the product dispense system 23 via the distribution valve 30 and boom supply line 32. The pressurized solution is dispensed to the field by the nozzles 24.

Optionally, when the rate of application is low, the PPP solution may be recirculated via the boom recirculation line 29.

During a rinse mode of operation, the pump 25 draws rinse fluid from the rinse tank 20 via the input manifold 28 and delivers the rinse fluid at pressure to a set of tank rinse nozzles 38 via the tank rinse line 34. The tank rinse nozzles 38 are mounted inside the product tank 18 and are positioned to direct a cleaning jet of fluid at the internal surfaces of the product tank 18.

Optionally, the rinse mode of operation may involve the distribution manifold 30 directing some or all of the pressurized rinse fluid through the boom supply line 32 and the boom recirculation line 29 to rinse chemical residue therefrom.

In some embodiments, the rinse fluid is heated by waste heat from the engine 16. A heat exchange system 40 comprises a closed fluid circuit having a heat exchanger 42 immersed in the rinse fluid inside the rinse tank 20. The heat exchanger 42 is fluidly connected in the fluid circuit to a further heat exchanger that is associated or integrated with engine 16. The fluid circuit includes a heated line 40H and a cooled line 40C.

The heat exchange system 40 may operate during a spraying mode of operation to scavenge and exploit the waste heat from engine 16 to heat the rinse fluid. By using heated rinse fluid, the cleaning effectiveness during the rinse mode is significantly improved.

A thermostat 43 in the heat exchange system may regulate the temperature of the rinse fluid. For example, the thermostat 43 may be adapted to regulate the temperature from about 60° C. (140° F.) to about 70° C. (158° F.). Although a connection is not shown, the thermostat 43 may be in communication with the ECU 36, wherein the ECU 36 may be configured to control the temperature of the rinse fluid dependent upon operating conditions or upon operator commands.

Figure 3:
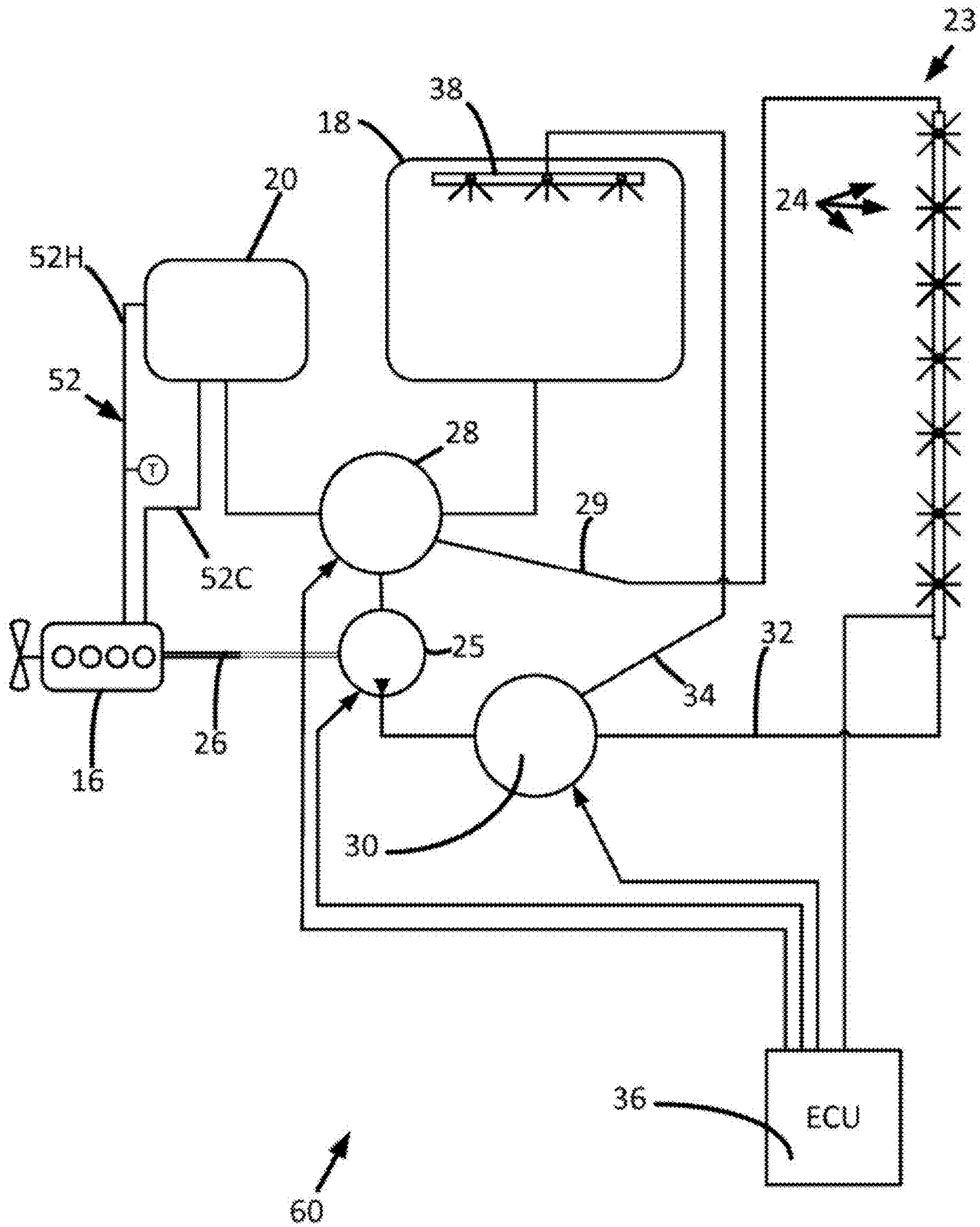
FIG. 3 is a schematic drawing of a sprayer system according to a second embodiment, for use with the sprayer of FIG. 1.

With reference to FIG. 3 a second embodiment of a spray system 60 uses a different heat exchange system to that shown in FIG. 2 and described above in relation to heating the rinse fluid. In this embodiment, waste heat from the engine 16 is recovered and transferred directly to the rinse fluid.

The heat exchange system 52 uses the rinse fluid itself as a heat exchange medium by transporting the rinse fluid from the rinse tank 20 to a heat exchanger associated with engine 16 and returning the heated fluid to the rinse tank 20. The fluid circuit comprises a heated line 52H and a cooled line 52C. The fluid may be circulated by a water pump (not shown) drivingly connected to the engine 16.

Figure 4:
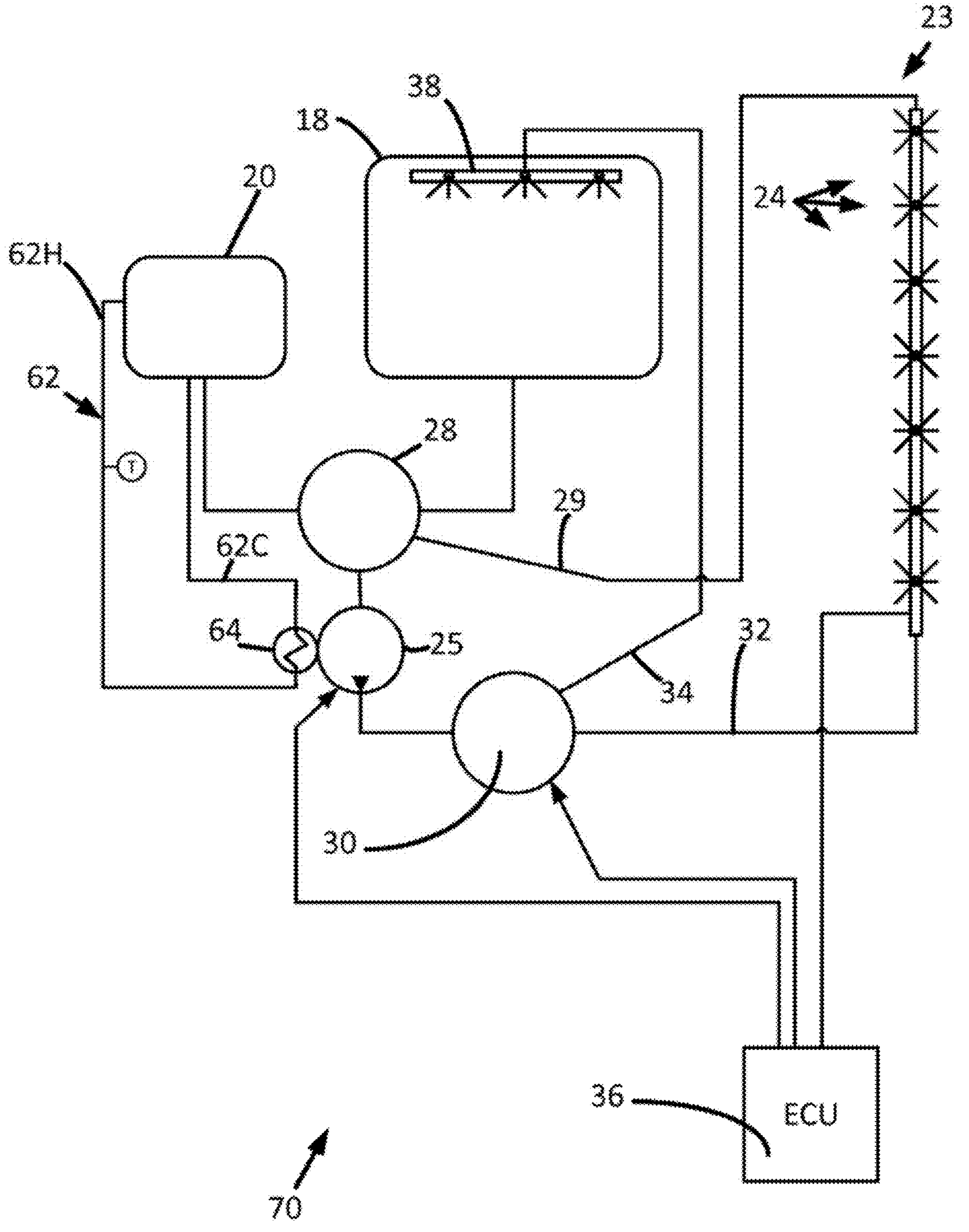
FIG. 4 is a schematic drawing of a sprayer system according to a third embodiment, for use with the sprayer of FIG. 1.

With reference to FIG. 4, a third embodiment of a spray system 70 uses waste heat from parts of an on-board hydraulic system, in this case the pump 25. It should be understood that engine 16 and the input manifold control line have been omitted from FIG. 4 only for reasons of clarity. In this embodiment, waste heat from the pump 25 is recovered and transferred directly to the rinse fluid.

A heat exchange system 62 comprises a heat exchanger 64 that is mounted proximate to, or integrated with, the pump 25. The heat exchanger 64 is connected in a fluid circuit having a heated line 62H and a cooled line 62C. The cooled line 62C conveys rinse fluid from rinse tank 20 to the heat exchanger 64, whereas the heated line conveys heated rinse fluid from the heat exchanger 64 to the rinse tank 20. A pump (not shown) may be provided in the fluid circuit to force movement of the rinse fluid.

In the embodiment illustrated by FIG. 4 the rinse fluid is heated directly by the heat exchange system 62. However, an independent closed fluid circuit could alternatively be provided together with a heat exchanger in the rinse tank 20 to heat the rinse fluid indirectly.

Although waste heat from the pump 25 of the sprayer system 70 is extracted in this embodiment, waste heat from other components of a hydraulic system could instead be scavenged.

Figure 5:
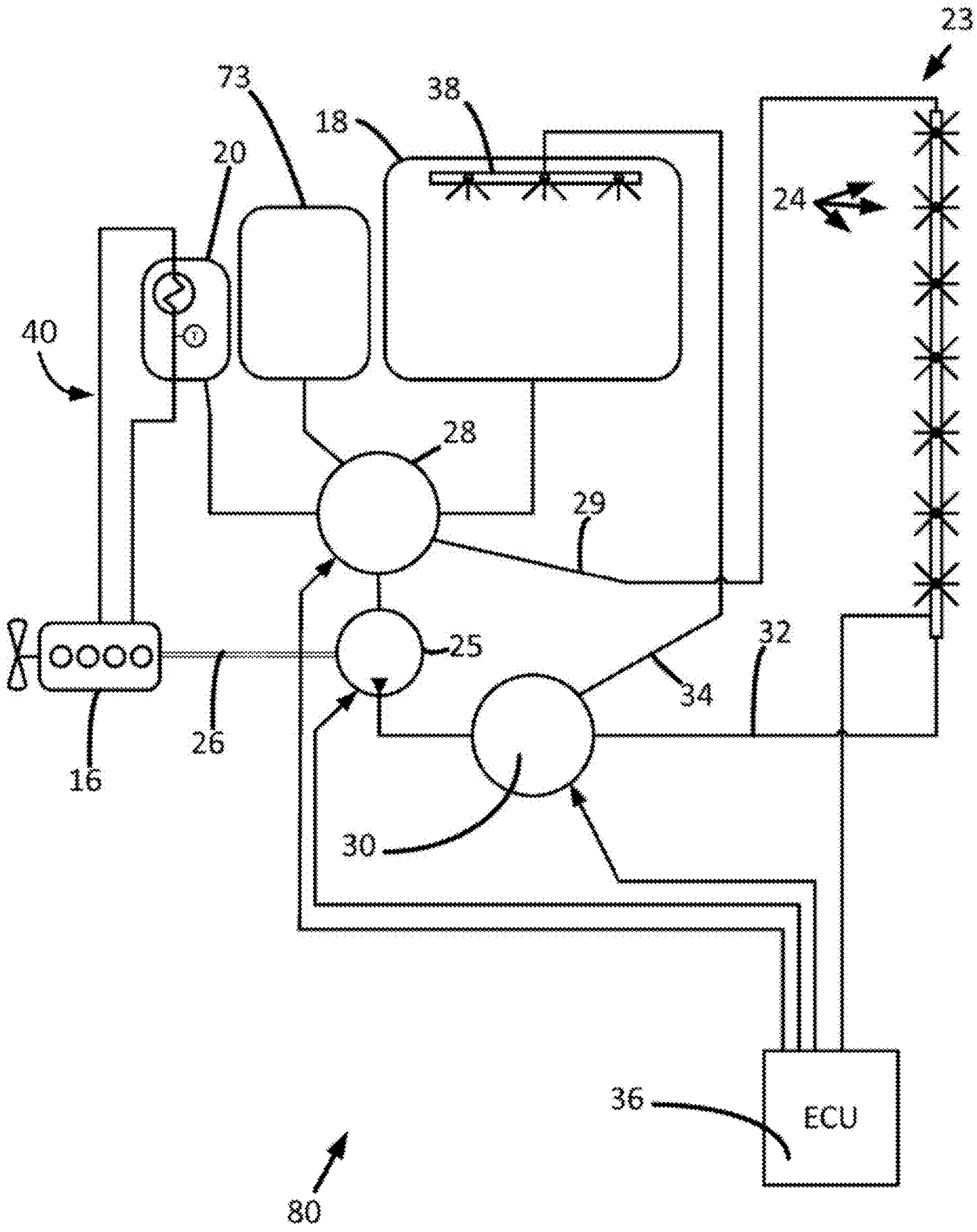
FIG. 5 is a schematic drawing of a sprayer system according to a fourth embodiment, for use with the sprayer of FIG. 1.

In a fourth embodiment shown in FIG. 5, a spray system 80 comprises a heated rinse tank 20 and a cold rinse tank 73. The rinse fluid in the heated rinse tank 20 is heated using a heat exchange system 40 which is the same as that used by the first embodiment illustrated in FIG. 2. However, it should be appreciated that the manner in which the rinse fluid is heated is not critical to this embodiment.

The cold rinse tank 73 serves to hold a volume of rinse fluid at ambient temperature (which is generally cooler than the heated rinse fluid) as is common in known sprayers. The cold water rinse tank 73 has an outlet connected to the input manifold 28 for selective delivery of cold rinse fluid through the pump 25.

It is recognized that, depending on the temperature, heated rinse fluid may cause damage to crops, and therefore discharge of the dilute rinsings should be avoided in some situations. The cold rinse fluid from the cold rinse tank 73 can be used in a second stage of rinsing to cool the rinse fluid before being discharged.

Figure 6:
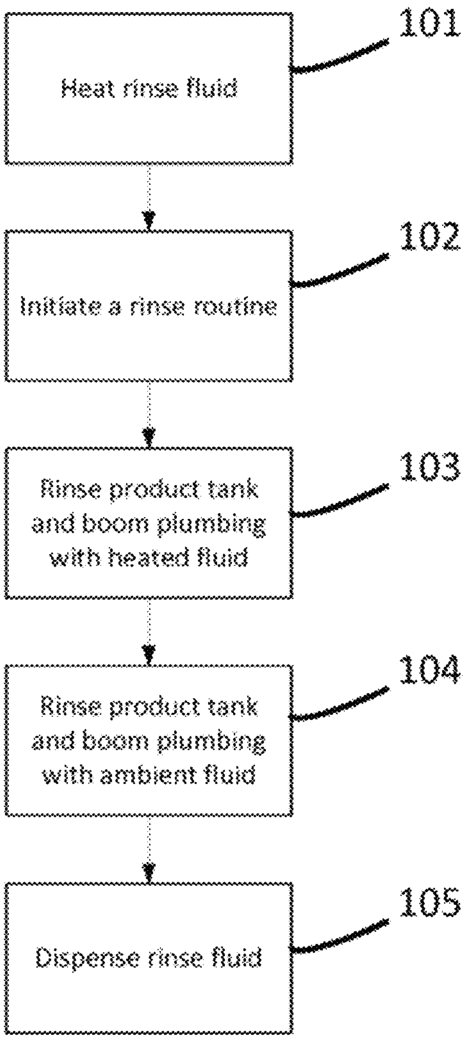
FIG. 6 is a process diagram for an operating method of the sprayer system of FIG. 5.

An example method of operation of the spray system 80 of FIG. 5 is illustrated in FIG. 6. In a first step 101, the rinse fluid in heated rinse tank 20 is heated above ambient temperature by transfer of waste heat from the engine 16 as explained above in relation to FIG. 2. For example, the heated rinse fluid may be heated in excess of 40° C. (104° F.).

In a second step 102, a rinse routine is initiated by a user command to the ECU 36. In response, the ECU 36 controls input manifold 28 (third step 103) to connect the heated rinse tank 20 to the pump 25. Also, the ECU 36 controls the distribution manifold 30 to connect the pressure side of pump 25 to one or both of the boom supply line 32 and the tank rinse line 34. As part of this rinse process, the rinsings may be recirculated via the boom recirculation line 29 and/or the outlet of product tank 18.

In a fourth step 104, the ECU 36 controls the input manifold 28 to connect the cold rinse tank 73 to the pump 25. This directs the cold (or ambient) rinse fluid in the cold rinse tank 73 through the plumbing network and to the tank rinse nozzles 38.

In a fifth step 105, the rinsings are dispensed typically via the nozzles 24.

Although the above-described embodiments have involved the scavenging of waste heat from prime movers or hydraulic systems, dedicated heating sources may heat the rinse fluid in the rinse tank 20. For example, a diesel burner or an electrically powered immersion heater could be provided in an embodiment.

Although the focus of the above-described embodiments has been on a self-propelled crop sprayer, aspects of the disclosure can be implemented on trailed sprayers. In one embodiment, heat may be scavenged from an engine or exhaust of a tractor to which the sprayer is attached. In another embodiment, heat may be scavenged from a PTO-driven pump mounted to the chassis of a trailed sprayer.

In summary, an agricultural crop sprayer may include a product tank for holding a solution of plant protection product, a product dispense system, and a rinse tank for holding a rinse fluid. A plumbing network fluidly connects the product tank, the product dispense system, and the rinse tank. A heat source is provided to heat the rinse fluid. The heat source may be a prime mover or a hydraulic pump from which waste heat is scavenged.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method for treating an agricultural field, the method comprising:

propelling an agricultural sprayer through a field, the agricultural sprayer comprising a chassis carried by a plurality of ground-engaging elements, the chassis carrying an engine, a boom, a product tank, and a rinse tank;

heating a rinse fluid to a temperature above an ambient temperature using waste heat from a heat source;

rinsing a plurality of nozzles carried by the boom by transferring the heated rinse fluid from the rinse tank through the plurality of nozzles; and after rinsing the plurality of nozzles, spraying liquid from the product tank to the agricultural field.

2. The method of claim 1, wherein heating the rinse fluid comprises circulating a heat exchange fluid in a plumbing network comprising a closed fluid circuit including a first heat exchanger.

3. The method of claim 1, wherein heating the rinse fluid comprises heating the rinse fluid using waste heat from the engine.

4. The method of claim 1, wherein heating the rinse fluid comprises heating the rinse fluid using waste heat from a hydraulic pump carried by the chassis.

5. The method of claim 1, wherein heating the rinse fluid comprises passing the rinse fluid adjacent the heat source.

6. The method of claim 1, wherein heating the rinse fluid comprises passing a heat exchange fluid through the rinse tank.

* * * * *